United States Patent
Schmidt et al.

[11] Patent Number: 5,522,259
[45] Date of Patent: Jun. 4, 1996

[54] PROCESS AND ARRANGEMENT FOR MEASURING MULTIPLE DISK BRAKE WEAR

[75] Inventors: Thomas Schmidt, Roth; Siegfried Bulikewitz, Lauf; Helmut Reisinger, Nuermberg, all of Germany

[73] Assignee: O&K Orenstein & Koppel AG, Berlin, Germany

[21] Appl. No.: 295,821

[22] PCT Filed: Nov. 22, 1993

[86] PCT No.: PCT/EP93/03264

§ 371 Date: Oct. 12, 1994

§ 102(e) Date: Oct. 12, 1994

[87] PCT Pub. No.: WO94/12849

PCT Pub. Date: Jun. 9, 1994

[30] Foreign Application Priority Data

Nov. 26, 1992 [DE] Germany .................. 42 39 688.3
Nov. 11, 1993 [DE] Germany .................. 43 38 468.4

[51] Int. Cl.⁶ .................................................. G01L 5/28
[52] U.S. Cl. .............................................. 73/121; 73/132
[58] Field of Search ...................... 73/121, 122, 129, 73/130, 132

[56] References Cited

U.S. PATENT DOCUMENTS

| | | | |
|---|---|---|---|
| 1,690,121 | 11/1928 | Klimek | 73/121 |
| 2,677,959 | 5/1954 | Corey | 73/121 |
| 3,412,603 | 11/1968 | Obarski | 73/121 |
| 3,641,813 | 2/1972 | Groat et al. | 73/121 |
| 3,648,511 | 3/1972 | Groat et al. | 73/121 |
| 4,136,634 | 1/1979 | Wilson | 73/129 |
| 4,241,603 | 12/1980 | Han et al. | 73/129 |
| 4,307,604 | 12/1981 | Domitter | 73/121 |
| 4,948,930 | 8/1990 | Karlsson | 73/132 |
| 5,167,148 | 12/1992 | Black et al. | 73/121 |
| 5,343,733 | 9/1994 | Nakagawa et al. | 73/121 |

FOREIGN PATENT DOCUMENTS

| | | |
|---|---|---|
| 2734786 | 2/1979 | Germany . |
| 3216401 | 11/1983 | Germany . |
| 3606876 | 9/1987 | Germany . |
| 2024345 | 1/1980 | United Kingdom . |

Primary Examiner—Richard Chilcot
Assistant Examiner—George M. Dombroske
Attorney, Agent, or Firm—Spencer & Frank

[57] ABSTRACT

A process and apparatus for measuring the wear of a multiple disk brake while a wheel hub is rotationless. A measuring instrument is provided having a screw-like component and a spindle. A plug element located in a predetermined bore of the wheel hub is replaced with the screw-like component. The brakes are actuated, the spindle is moved while the brakes are actuated until the spindle comes into contact with a supporting disk that axially supports the multiple disks. The distance the spindle was moved is ascertained to form a first measured value. The brakes are then released, and the spindle is moved again, until the spindle again comes into contact with the supporting disk. The distance the spindle was moved is ascertained to form a second measured value. The difference between the first measured value and the second measured value is determined to ascertain a piston stroke, and the wear of the multiple disk brakes is ascertained from the piston stroke.

21 Claims, 3 Drawing Sheets

PROCESS AND ARRANGEMENT FOR MEASURING MULTIPLE DISK BRAKE WEAR

BACKGROUND OF THE INVENTION

The invention relates to a process for measuring wear in multiple disk brakes, especially those that run wet, of axles with planetary gear units, in that a plug element, disposed in a predetermined bore in the wheel hub, is replaced by a screw-like component cooperating with a measuring instrument.

Multiple disk brakes, in particular oil-lubricated multiple disk brakes, are components that are indeed subject to relatively little wear; nevertheless, demands are made by the Technische Überwachungsvereine [official automobile inspection agencies in Germany] that dictate at least sporadic measurement of wear, particularly at scheduled maintenance times.

In axles, it is known to unscrew the oil drain screw and to screw in a measuring instrument; the measuring instrument is secured against rotation by means of a screw plug. The measuring instrument itself is embodied as a screw that is provided eccentrically inside the screw that replaces the oil drain screw. This eccentrically disposed screw is moved toward the disk that supports the multiple disks, and the wheel is then rotated in the circumferential direction, so as in this way to avoid tilting of the disk. By means of a depth gauge, the distance between the end face of the wheel hub and the head of the screw is ascertained. One disadvantage of this process and arrangement is that on the one hand the screw that replaces the oil drain screw must be machined, which is expensive, so as to receive the eccentrically disposed screw. The eccentricity is required, to allow the measuring screw to be removed in the direction of the disk that supports the multiple disks; for safety reasons, rotation of the wheel must also be done, to preclude tilting of the disk.

SUMMARY OF THE INVENTION

The object of the invention is to conceive of a process for wear measurement of multiple disk brakes, and an arrangement operating by that process, with which the wear measurement can be done without major effort or expense, and the measuring instrument should be structurally simple and designed for various applications.

In terms of the process, this object is attained by a spindle, cooperating with the measuring instrument, that after brake actuation without further rotation of the wheel hub is moved up as far as the disk that axially supports the multiple disks, and this distance is ascertained as a first measured value, and next the brake is released again and the spindle is moved farther until it again comes into contact with the disk, and this distance is ascertained as a second measured value, wherein the difference between the two measured values is the piston stroke, from which the wear is ascertained.

Depending on the constructive design of the arrangement, the wear or in other words the relevant piston stroke can be read directly from the spindle, on the one hand, and on the other ascertained from the depth gauge of a measuring slide to be positioned against it from outside.

An arrangement operating by this process is characterized in that the spindle is movably guided concentrically inside the screwlike component, has a predetermined thread pitch, and is movable to a tilt-free region of the disk.

An arrangement operating alternatively by the process of the invention is characterized in that the spindle is embodied by the screwlike component, which on its end toward the disk cooperates with a concentrically disposed pin that is movable together with the component within a tilt-free region of the disk.

The concept of the invention is based on the fact that the air play of the respective multiple disk brake, which is equivalent to the piston stroke and increases as the friction linings wear down, is measured via a measuring spindle whose thread is located either in the screwlike component or in the wheel hub. In both variants, the axial distance between the wheel hub and the supporting disk is ascertained, once with the brake actuated (piston extended) and then with the brake relieved. The difference in the measurements is the air play in the brake. By subtracting the basic air play upon installation of the brake, the total wear of the brake package over a predetermined period of time can easily be ascertained. Testing of the brake linings is done when the vehicle is at a standstill.

For measurement, the screw plug, which may already be present in the region of the respective wheel hub, is removed, and the measuring instrument is screwed in. The brake is actuated and left in this position. As a result, the annular piston is extended, and the brake package is pressed against the supporting disk. The spindle is then screwed in until it strikes the supporting disk. This position is recorded. Next, the brake is released, and the springs retrieve the annular piston to its initial position. The spindle can then be screwed onward as well until it again strikes the supporting disk. The spindle travel between the first and second stop is equivalent to the piston stroke and thus to the air play present in the brake.

Preferably, the wear is ascertained in the course of the already schedules maintenance times. The invention is applicable to trucks, such as dump trucks for garbage, mobile construction and other heavy equipment, such as wheel loaders.

BRIEF DESCRIPTION OF THE DRAWINGS

The invention is shown in the drawing in terms of an exemplary embodiment and will be described as follows. Shown are.

BRIEF DESCRIPTION OF THE INVENTION

Figure 1:
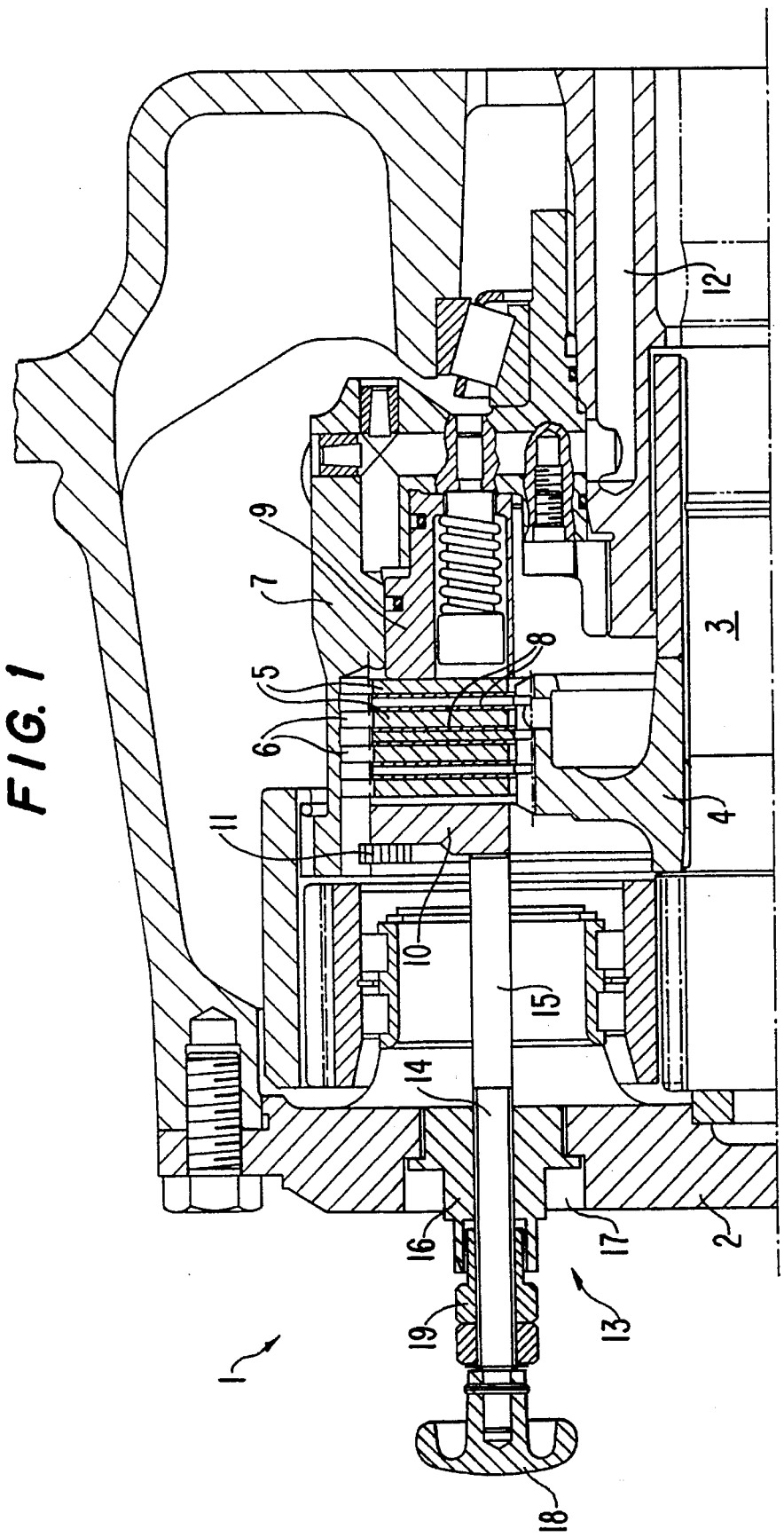
FIG. 1—a fragmentary view of a multiple disk brake with a measuring instrument.

FIG. 1 in a fragmentary view shows a multiple disk brake 1, which as its essential components contains a wheel hub 2, inside which a drive shaft 3 is disposed. Inner multiple disks 5 are secured to the multiple disk carrier 4 that is supported on the drive shaft 3. The multiple disk carrier 4 is surrounded by a hollow wheel carrier 7 that carries outer multiple disks 6; the outer multiple disks 6 are disposed between the inner multiple disks 5. The friction linings of the various multiple disks 5, 6 are all identified by reference numeral 8 here for the sake of simplicity. Axially behind the multiple disks 5, 6, there is an annular piston 9 which is movable toward the multiple disks 5, 6 inside the hollow wheel carrier 7 and upon brake actuation moves them axially toward a supporting disk 10, which is restrained from sliding within the hollow wheel carrier 7 by means of a securing ring 11. The annular piston 9 is acted upon by hydraulic oil via the pressure line 12 upon brake actuation.

In order now to ascertain wear of the friction linings 8, a measuring instrument 13 is employed which includes a spindle 14 with interchangeable insert pins 14. The spindle 15 is surrounded by a screwlike component 16, which is inserted, instead of an oil fill screw, not shown in further detail here, into the associated bore 17 of the wheel hub 2. Outside the hub 2, the spindle 14 is provided with a grip 18, by means of which the spindle can be moved toward the supporting disk 10. The measuring instrument 13 includes an indicator 19 for the measured values ascertained, which will be described in further detail in the following drawing figures.

Figure 2:
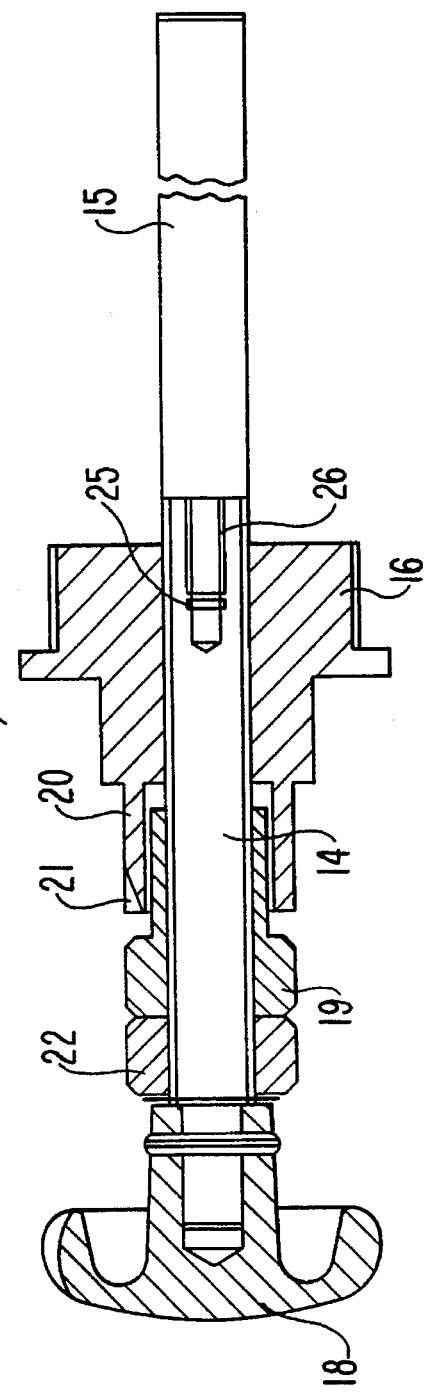
FIG. 2—a cross section through the measuring instrument.

FIG. 2 shows the measuring instrument 13 according to the invention, which essentially includes the following components: a spindle 14 with a pitch p=1, a screwlike component 16 with a concentric bore 25, an interchangeable insert pin 15 with a thread 6, which pin is screwed into the spindle 14, and a grip 18, embodied as a star-shaped knob, for adjusting the spindle 14 inside the component 16. The indicator, embodied by a scale-bearing drum 19, is provided between the grip 18 and the component 16 and is movable toward the component 16. The component 16 is provided with an axial attachment 20 that toward the scale-bearing drum has a marking 21, which in the manner of a micrometer can be made to match the graduations on the scale-bearing drum 19. To avoid incorrect measurement findings, a knurled nut 22, which can be used as a lock nut, is provided axially behind the scale-bearing drum 19.

Figure 3:
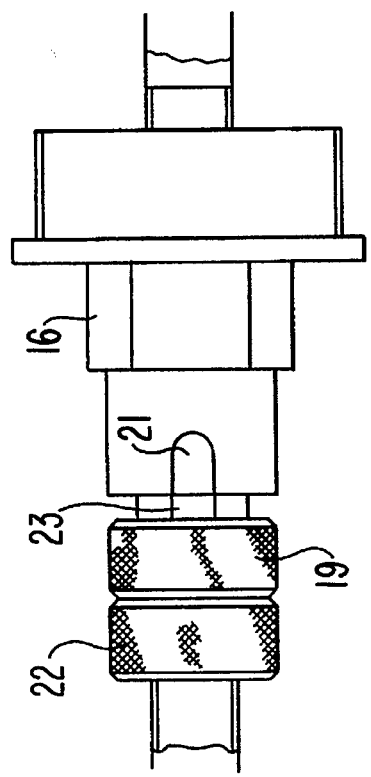
FIG. 3—a fragmentary view of the indicator of the measuring instrument of FIG. 2.

FIG. 3 is a fragmentary view of the indicator, namely the component 16, the scale-bearing drum 19 and the knurled nut 22. The marking 21 and the scale 23 on the scale-bearing drum 19 can also be seen.

The measuring process is approximately as follows:

The oil fill screw, not shown in further detail here, is replaced by the component 16 that contains the measuring instrument 13. The brake is depressed so that the multiple disks 5, 6 are moved onto the supporting disk 10. By means of the grip 18, the spindle 14, connected to the insert pin 15, is moved in the direction of the supporting disk 10 until the insert pin 15 comes to rest on the end face 24 of the supporting disk 10 in a tilt-free region (radially as inward as possible). The first measurement event takes place with the brake depressed. Once this first measured value has been fixed on the scale-bearing drum 19, the brake is released and the spindle 14 is readjusted by means of the grip 18 in the direction of the supporting disk 10 until it again contacts the supporting disk 10. The second measured value minus the first one, which can be read directly from the scale-bearing drum 19, is the piston stroke and the resultant total wear of the friction linings 8.

Figure 4:
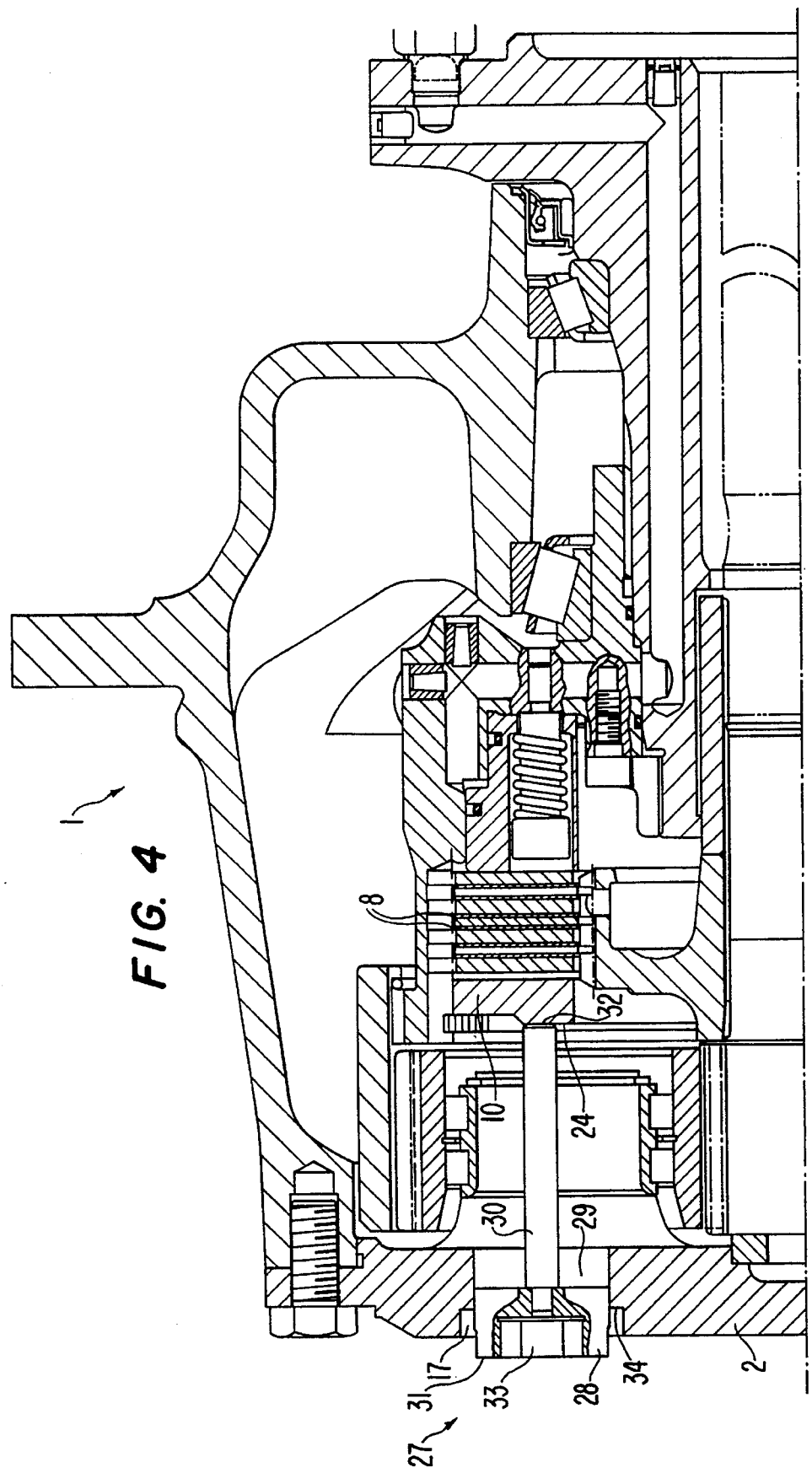
FIG. 4—fragmentary view of the multiple disk brake of FIG. 1 with an alternative measuring instrument.

FIG. 4, again in a fragmentary view, shows the multiple disk brake 1 already shown in FIG. 1. Since the design is identical, the same reference numerals are also used. A difference from FIG. 1 is the type of measuring instrument 27 used in this example. The measuring instrument 27 comprises a screwlike component 28, which at the same time forms the spindle, which is permanently connected to the pin 30 in the region of its end face 29 toward the supporting disk 10. In the region of its other end face 31, the component 28 is embodied as collarless; that is, it has no radial attachments whatever, as the component 16 of FIG. 1 does, that are supported on corresponding counterpart faces. Here, the pin 30 is provided with a spherical end face 32 toward the supporting disk; this end face comes to rest on the end face 24 of the supporting disk 10 when the component 28 is screwed into the bore 17.

The measuring operation is similar to that described already above:

At the beginning of measurement, the wheel hub 2 is rotated such that the screw plug that closes off the measurement bore 17 during operation is rotated upward, so that oil will not drain out when it is unscrewed. Next, the screw plug is unscrewed and removed, and the component 28 forming the measuring instrument 27 is screwed in to a depth of from 2 to 3 threads. The component 28, analogously to the screw plug, has a hexagonal socket 33 and can be turned using the same socket wrench as was used before to remove the screw plug. The brake is now actuated, and the brake pedal is left depressed. The component 28 is screwed in manually tight, until the end face 32 of the pin 30 comes to rest on the end face 24 of the supporting disk 10. Next, with the depth gauge of a measuring slide, not shown here, the measurement between the face end 31 of the component 28 and the end face 34 of the flat countersunk feature in the region of the bore 17 is ascertained. The brake is then released, and the component 28 is screwed farther inward until the pin again strikes the support disk 10. By remeasurement and subtracting the two measures, a measure characteristic for the wear in the wheel hub 2 can be ascertained. By comparison with a limit measure, it is then certain whether the friction linings 8 and hence the inner multiple disks 5 need to be replaced.

We claim:

1. A method for measuring the wear of a multiple disk brake while a wheel hub is rotationless, comprising the steps of:

(A) providing a measuring instrument having a screw-like component and a spindle;

(B) replacing a plug element located in a predetermined bore of the wheel hub with the screw-like component;

(C) actuating the brakes;

(D) moving the spindle while the brakes are actuated until the spindle comes into contact with a supporting disk that axially supports the multiple disks;

(E) ascertaining a distance the spindle is moved in step D to form a first measured value;

(F) releasing the brakes;

(G) moving the spindle, after step F, until the spindle again comes into contact with the supporting disk;

(H) ascertaining a distance the spindle is moved in step G to form a second measured value;

(I) determining a difference between the first measured value and the second measured value to ascertain a piston stroke; and (J) ascertaining the wear of the multiple disk brakes from the piston stroke.

2. The method defined in claim 1, wherein step I includes the step of ascertaining the piston stroke by reading the piston stroke directly from the spindle.

3. The method defined in claim 1, wherein said measuring instrument includes a measuring slide having a depth gauge and said step I includes the step of ascertaining the piston stroke from the depth gauge.

4. A measuring instrument for performing the method defined in claim 1, comprising:

a screw-like component; and a spindle axially movably guided concentrically inside said screw-like component, having a predetermined thread pitch, and being movable to a tilt-free region of the supporting disk.

5. A measuring instrument for performing the method defined in claim 1, comprising:

a screw-like component;

a concentrically disposed pin; and a spindle forming a unitary structure with said screw-like component, said unitary structure having an end in a region toward the supporting disc cooperating with said pin, said unitary structure and said pin being movable together, said pin being movable to a tilt-free region of the supporting disk.

6. The measuring instrument defined in claim 4, wherein said spindle includes interchangeable insert pins.

7. The measuring instrument defined in claim 4, wherein said spindle has a thread pitch of p=1 mm.

8. The measuring instrument defined in claim 7, wherein said spindle includes an insert pin movable into a radially inner region of the supporting disk.

9. The measuring instrument defined in claim 7, wherein said spindle has a grip located in a region outside the wheel hub.

10. The measuring instrument defined in claim 9, further comprising an indicator axially disposed between said grip and said component screw-like component.

11. The measuring instrument defined in claim 10, wherein said indicator comprises a scale-bearing drum surrounding said spindle and being movable toward said screw-like component.

12. The measuring instrument defined in claim 11, wherein said screw-like component is provided with at least one indicator mark on a side toward said scale-bearing drum.

13. The measuring instrument defined in claim 11, further comprising a knurled lock nut adjacent to said scale-bearing drum for locking said scale-bearing drum in position.

14. The measuring instrument defined in claim 7, wherein said spindle includes an insert pin having a rounded end in a region toward the supporting disk.

15. The measuring instrument defined in claim 5, wherein said screw-like component is collarless.

16. The measuring instrument defined in claim 15, wherein said pin is permanently connected to said screw-like component.

17. The measuring instrument defined in claim 15, wherein said pin has a rounded end face in a region toward the supporting disk.

18. The measuring instrument defined in claim 14, wherein said screw-like component is insertable into a bore of an oil filling screw.

19. A measuring instrument for measuring the wear of a multiple disk brake, the multiple disk brakes including a supporting disk that axially supports the multiple disks, and a wheel hub located adjacent to the supporting disk and having a predetermined bore therethrough, said measuring instrument comprising:

a spindle movable relative to the supporting disc; and a screw-like component that cooperates with said spindle, and being insertable into the predetermined bore; said spindle being moved while the brakes are actuated until said spindle comes into contact with the supporting disk for determining a first measured value; and said spindle being movable after the brakes are released until the spindle again comes into contact with the supporting disk for determining a second measured value, wherein a difference between the first measured value and the second measured value is indicative of the wear of the multiple disk brakes.

20. The measuring instrument defined in claim 19, wherein said spindle is axially movably guided concentrically inside said screw-like component, has a predetermined thread pitch, and is movable to a tilt-free region of the supporting disk.

21. The measuring instrument defined in claim 19, further comprising a concentrically disposed pin; wherein said spindle and said screw-like component form a unitary structure having an end in a region toward the supporting disc cooperating with said pin, said unitary structure and said pin being movable together, said pin being movable to a tilt-free region of the supporting disk.

* * * * *